US010994698B2

(12) United States Patent
Nozaki

(10) Patent No.: US 10,994,698 B2
(45) Date of Patent: May 4, 2021

(54) REMOTE KEYLESS ENTRY SYSTEM

(71) Applicant: ALPS ALPINE CO., LTD., Tokyo (JP)

(72) Inventor: Takashi Nozaki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/854,039

(22) Filed: Apr. 21, 2020

(65) Prior Publication Data

US 2020/0247361 A1 Aug. 6, 2020

Related U.S. Application Data

(63) Continuation of application No. PCT/JP2018/032091, filed on Aug. 30, 2018.

(30) Foreign Application Priority Data

Nov. 14, 2017 (JP) .............................. JP2017-219365

(51) Int. Cl.
*B60R 25/20* (2013.01)
*B60R 25/24* (2013.01)
(Continued)

(52) U.S. Cl.
CPC ........ *B60R 25/2072* (2013.01); *B60R 25/245* (2013.01); *G01C 5/06* (2013.01);
(Continued)

(58) Field of Classification Search
CPC ..... B60R 25/2072; B60R 25/245; G01C 5/06; G07C 9/00309; G07C 9/00817;
(Continued)

(56) References Cited

U.S. PATENT DOCUMENTS

2007/0273553 A1* 11/2007 Albrecht ................. B60R 25/20
340/932.2
2014/0340193 A1* 11/2014 Zivkovic ............ G07C 9/00309
340/5.61
(Continued)

FOREIGN PATENT DOCUMENTS

JP 2010-121297 6/2010
JP 2012-067463 4/2012
(Continued)

OTHER PUBLICATIONS

International Search Report for PCT/JP2018/032091 dated Oct. 23, 2018.

*Primary Examiner* — Nabil H Syed
(74) *Attorney, Agent, or Firm* — IPUSA, PLLC

(57) ABSTRACT

A remote keyless entry system includes an in-vehicle device including an in-vehicle device controller, an in-vehicle device transmitter that transmits an in-vehicle device signal, and an in-vehicle device receiver that receives a portable device signal, and a portable device including a portable device controller, an acceleration sensor, a portable device receiver, and a portable device transmitter, wherein the portable device controller calculates a distance from the in-vehicle device to the portable device based on the in-vehicle device signal, calculates a first travel distance based on acceleration, and causes the portable device transmitter to transmit the portable device signal including at least the distance, the in-vehicle device controller receives the portable device signal multiple times and calculates a second travel distance based on distances included in received portable device signals, and whether a relay attack is performed is determined based on the first travel distance and the second travel distance.

8 Claims, 7 Drawing Sheets

(51) Int. Cl.
   *G01C 5/06* (2006.01)
   *G07C 9/00* (2020.01)
   *H04W 4/02* (2018.01)

(52) U.S. Cl.
   CPC ..... *G07C 9/00309* (2013.01); *G07C 9/00817* (2013.01); *H04W 4/027* (2013.01); *G07C 2009/00555* (2013.01); *G07C 2009/00841* (2013.01)

(58) Field of Classification Search
   CPC ........... G07C 2009/00555; G07C 2009/00841; H04W 4/027
   See application file for complete search history.

(56) References Cited

U.S. PATENT DOCUMENTS

| | | | | |
|---|---|---|---|---|
| 2014/0375420 | A1* | 12/2014 | Seiberts | B60R 25/20 340/5.31 |
| 2017/0303084 | A1* | 10/2017 | Bruckner | H04W 4/023 |
| 2017/0352211 | A1* | 12/2017 | Asmar | G07C 9/00309 |
| 2018/0186332 | A1* | 7/2018 | Bocca | H04W 12/08 |
| 2019/0026483 | A1* | 1/2019 | Boireau | G06F 21/35 |

FOREIGN PATENT DOCUMENTS

| | | |
|---|---|---|
| JP | 2014-218176 | 11/2014 |
| JP | 2017-088016 | 5/2017 |

* cited by examiner

FIG.2
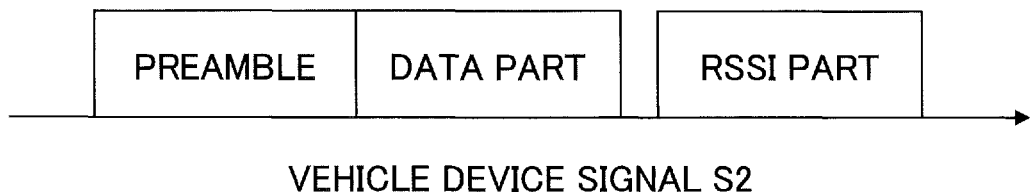
VEHICLE DEVICE SIGNAL S2
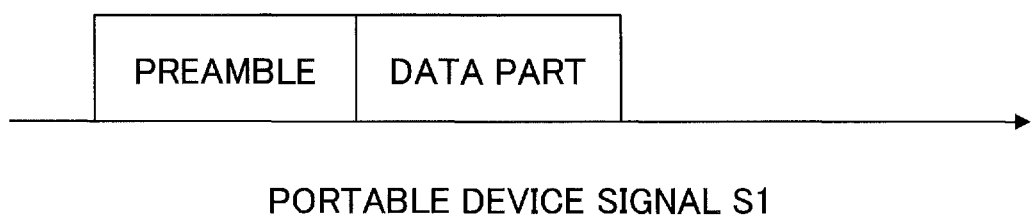
PORTABLE DEVICE SIGNAL S1
FIG.3
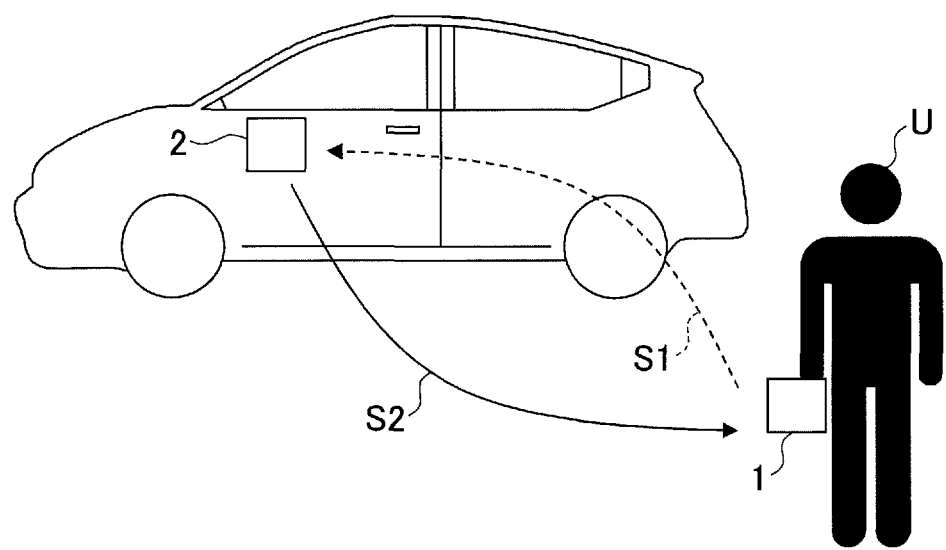

REMOTE KEYLESS ENTRY SYSTEM

CROSS-REFERENCE TO RELATED APPLICATION

This application is a continuation application of International Application No. PCT/JP2018/032091 filed on Aug. 30, 2018, and designated the U.S., which is based upon and claims priority to Japanese Patent Application No. 2017-219365, filed on Nov. 14, 2017, the entire contents of which are incorporated herein by reference.

BACKGROUND OF THE INVENTION

1. Field of the Invention

The present disclosure relates to a remote keyless entry system.

2. Description of the Related Art

A remote keyless entry system (which will be hereinafter referred to as an RKE system) has been utilized as a system that wirelessly controls unlocking and locking of a vehicle. In the RKE system, an in-vehicle device periodically transmits a wireless signal and a portable device of a user approaching a vehicle responds to the wireless signal, thereby controlling unlocking and locking of the vehicle.

In recent years, a relay attack on a vehicle in which the RKE system is installed has been a problem. The relay attack is an unlocking method in which an improper person uses a relaying device to relay a wireless signal from an in-vehicle device to a portable device of a proper user, so that a vehicle is unlocked even though the proper user is away from the vehicle. As a measure against such a relay attack, a method of detecting a relay attack based on the presence of movement of a portable device measured by a motion sensor that is installed in the portable device, is proposed.

However, in recent years, advancement of a relay attack has made it difficult to detect a relay attack only with the presence of movement of a portable device.

RELATED-ART DOCUMENTS

Patent Document

Patent Document 1: Japanese Laid-Open Patent Publication No. 2017-088016

SUMMARY OF THE INVENTION

According to one aspect of an embodiment, a remote keyless entry system includes an in-vehicle device including an in-vehicle device controller, an in-vehicle device transmitter configured to transmit an in-vehicle device signal, and an in-vehicle device receiver configured to receive a portable device signal, and a portable device including a portable device controller, an acceleration sensor, a portable device receiver configured to receive the in-vehicle device signal, and a portable device transmitter configured to transmit the portable device signal, wherein the portable device controller calculates a distance from the in-vehicle device to the portable device based on the in-vehicle device signal, calculates a first travel distance of the portable device based on acceleration measured by the acceleration sensor, and causes the portable device transmitter to transmit the portable device signal including at least the distance, wherein the in-vehicle device controller calculates a second travel distance of the portable device based on said distances included in said portable device signals, and wherein it is determined whether a relay attack is performed based on the first travel distance and the second travel distance.

BRIEF DESCRIPTION OF THE DRAWINGS

FIG. 2 is a drawing illustrating an example of an in-vehicle device signal and a portable device signal;

FIG. 3 is a drawing for describing an overview of an operation of an RKE system;

DESCRIPTION OF THE PREFERRED EMBODIMENTS

Embodiments of the present invention will be described in the following with reference to the accompanying drawings. In the specification and drawings of the embodiments, an element having substantially the same functional configuration is referred to by the same numeral, and a duplicate description will be omitted.

An RKE system 100 according to one embodiment will be described with reference to FIGS. 1 to 8. The RKE system 100 according to the embodiment is a system for locking and unlocking a vehicle using a wireless signal.

Figure 1:
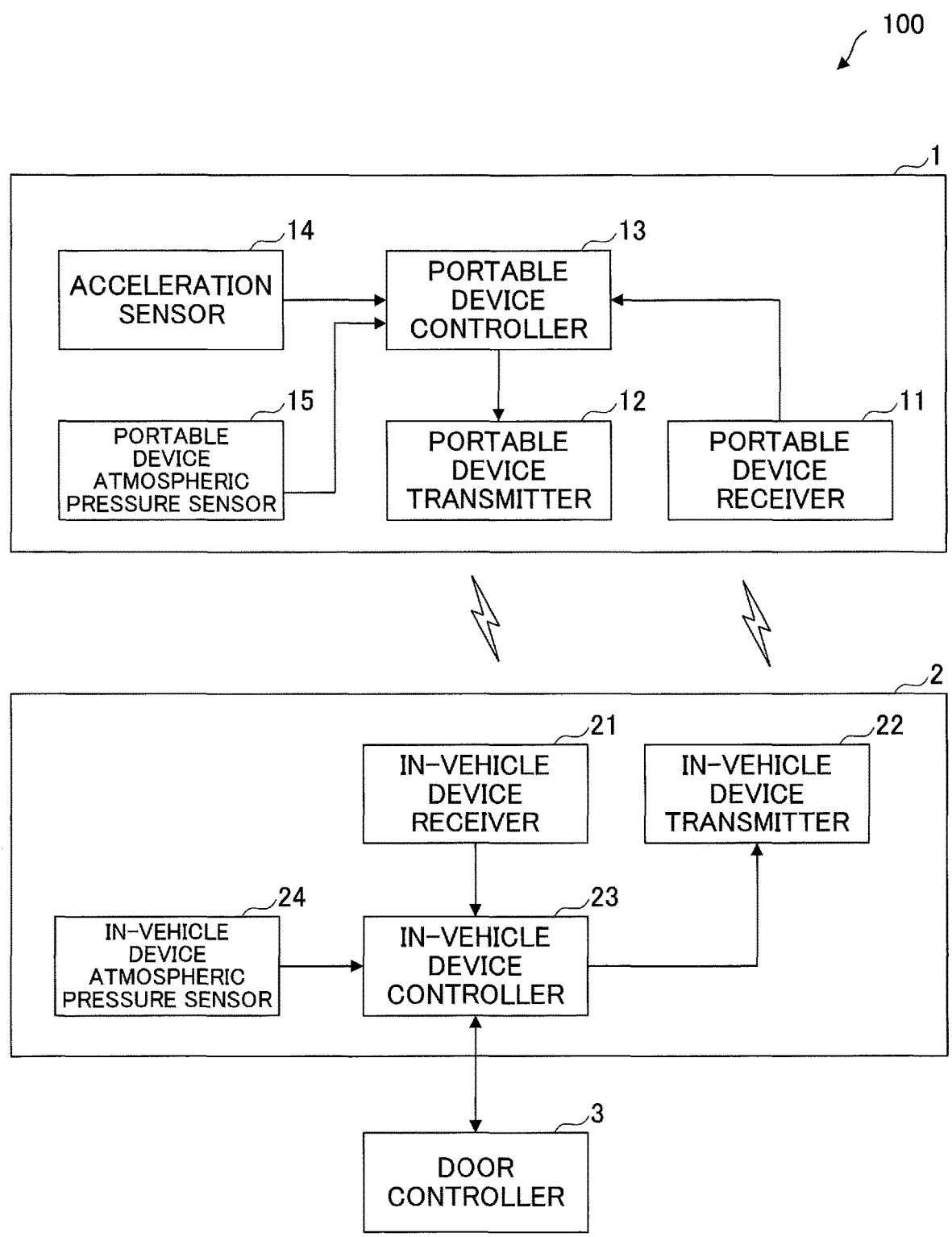
FIG. 1 is a drawing illustrating an example of an RKE system.

First, a hardware configuration of the RKE system 100 will be described. FIG. 1 is a drawing illustrating an example of the RKE system 100. The RKE system 100 illustrated in FIG. 1 includes a portable device 1 and an in-vehicle device 2.

The portable device 1 is a device carried by a proper user of the RKE system 100 (such as a vehicle driver). The portable device 1 illustrated in FIG. 1 includes a portable device receiver 11, a portable device transmitter 12, a portable device controller 13, an acceleration sensor 14, and a portable device atmospheric pressure sensor 15.

The portable device receiver 11 is hardware that receives an in-vehicle device signal S2 (a wireless signal) transmitted by the in-vehicle device 2. The in-vehicle device signal S2 is, for example, a 125 kHz LF (Low Frequency) signal, but is not limited to this. The communicable distance of the in-vehicle device signal S2 is, for example, 1 m or smaller, but is not limited to this. The portable device receiver 11 includes an antenna that converts the in-vehicle device signal S2 (i.e., the wireless signal) into an electrical signal and a receiving circuit that performs predetermined signal processing, such as demodulation, on the in-vehicle device signal S2 (i.e., the electrical signal). The receiving circuit includes a low noise amplifier, a filter, a mixer, and a demodulator circuit. The portable device receiver 11 inputs the signal on which predetermined signal processing is performed, to the portable device controller 13. The receiving circuit may be an independent integrated circuit (IC) or may be incorporated into the portable device controller 13.

The portable device transmitter 12 is hardware that transmits a portable device signal S1 wirelessly. The portable device signal S1 is, for example, a 315 MHz UHF (Ultra High Frequency) signal, but is not limited to this. The communicable distance of the portable device signal S1 is, for example, 20 m or smaller, but is not limited to this. The portable device transmitter 12 includes a transmitting circuit that performs predetermined processing, such as modulation, on the portable device signal S1 (i.e., the electrical signal) generated by the portable device controller 13, and an antenna that converts the portable device signal S1 (i.e., the electrical signal) into the wireless signal. The transmitting circuit includes a modulation circuit, a mixer, a filter, and a power amplifier. The transmitting circuit may be an independent IC or may be incorporated into the portable device controller 13. The portable device receiver 11 and the portable device transmitter 12 may also be included in one IC.

The portable device controller 13 is a circuit that controls an overall operation of the portable device 1 and includes a central processing unit (CPU), a read only memory (ROM), and a random access memory (RAM). The CPU controls each configuration unit of the portable device 1 with executing a program and achieves functions of the portable device controller 13. The program executed by the CPU and various data are stored in the ROM. A portable device ID, which is identification information of the portable device 1, and an in-vehicle device ID, which is identification information of the in-vehicle device 2 corresponding to the portable device 1, are previously stored in the ROM. The RAM provides a working area for the CPU. The portable device controller 13 is a microcomputer, for example, but is not limited to this.

The acceleration sensor 14 periodically measures acceleration of the portable device 1 and inputs the measured acceleration to the portable device controller 13.

A portable device atmospheric pressure sensor 15 periodically measures atmospheric pressure around the portable device 1 and inputs the measured atmospheric pressure to the portable device controller 13.

Here, the configuration of the portable device 1 is not limited to the example illustrated in FIG. 1. The portable device 1 may include a battery that supplies electric power to the portable device receiver 11, the portable device transmitter 12, the portable device controller 13, the acceleration sensor 14, and the portable device atmospheric pressure sensor 15, and may include an unlocking button and a locking button for a user to manually operate unlocking and locking of a vehicle.

The in-vehicle device 2 is a device that controls locking and unlocking a vehicle in accordance with the portable device signal S1 transmitted by the portable device 1 and is installed in the vehicle. The in-vehicle device 2 is supplied with electric power by the battery installed in the vehicle. The in-vehicle device 2 illustrated in FIG. 1 includes an in-vehicle device receiver 21, an in-vehicle device transmitter 22, an in-vehicle device controller 23, and an in-vehicle device atmospheric pressure sensor 24.

The in-vehicle device receiver 21 is hardware that receives the portable device signal S1 (i.e. the wireless signal) transmitted by the portable device 1. The in-vehicle device receiver 21 includes an antenna that converts the portable device signal S1 (i.e., the wireless signal) into an electrical signal, and a receiving circuit that performs predetermined signal processing, such as demodulation, on the portable device signal S1 (i.e., the electrical signal). The receiving circuit includes a low noise amplifier, a filter, a mixer, and a demodulation circuit. The in-vehicle device receiver 21 inputs the signal on which predetermined signal processing is performed, to the in-vehicle device controller 23. The receiving circuit may be an independent IC or may be incorporated into the in-vehicle device controller 23.

The in-vehicle device transmitter 22 is hardware that transmits the in-vehicle device signal S2 wirelessly. The in-vehicle device transmitter 22 includes a transmitting circuit that performs predetermined processing, such as modulation, on the in-vehicle device signal S2 (i.e., the electrical signal) generated by the in-vehicle device controller 23, and an antenna that converts the in-vehicle device signal S2 (i.e., the electrical signal) into the wireless signal. The transmitting circuit includes a modulation circuit, a mixer, a filter, and a power amplifier. The transmitting circuit may be an independent IC or may be incorporated into the in-vehicle device controller 23. The in-vehicle device receiver 21 and the in-vehicle device transmitter 22 may also be included in one IC.

The in-vehicle device controller 23 is a circuit that controls an overall operation of the in-vehicle device 2 and includes a CPU, a ROM, and a RAM. The CPU controls each configuration unit of the in-vehicle device 2 with executing a program and achieves functions of the in-vehicle device controller 23. The program executed by the CPU and various data are stored in the ROM. The in-vehicle device ID, which is identification information of the in-vehicle device 2, and the portable device ID, which is identification information of the portable device 1 corresponding to the in-vehicle device 2, are previously stored in the ROM. The RAM provides a working area for the CPU. The in-vehicle device controller 23 is a microcomputer, for example, but is not limited to this.

Additionally, the in-vehicle device controller 23 is connected to an in-vehicle network such as a Controller Area Network (CAN), communicates with a door controller 3 connected through the in-vehicle network, and requests the door controller 3 to lock and unlock the vehicle. The door controller 3 is a circuit for locking and unlocking a door of the vehicle, and locks or unlocks the door in response to a request from the in-vehicle device controller 23. The door controller 3 is, for example, a microcomputer, but is not limited to this.

The in-vehicle device atmospheric pressure sensor 24 periodically measures atmospheric pressure around the in-vehicle device 2 and inputs the measured atmospheric pressure to the in-vehicle device controller 23.

The configuration of the in-vehicle device 2 is not limited to the example illustrated in FIG. 1. The in-vehicle device 2 may include a battery that supplies electric power to the in-vehicle device receiver 21, the in-vehicle device transmitter 22, the in-vehicle device controller 23, and the in-vehicle device atmospheric pressure sensor 24, and may be able to communicate an in-vehicle component other than the door controller (such as an engine controller) through the in-vehicle network.

Next, the in-vehicle device signal S2 and the portable device signal S1 will be described. FIG. 2 is a drawing illustrating an example of the in-vehicle device signal S2 and the portable device signal S1.

The in-vehicle device signal S2 includes a preamble, a data part, and a received signal strength indicator (RSSI) part. The preamble is a signal part having a predetermined pattern indicating that the signal is the in-vehicle device signal S2. The data part is a signal part having information (such as a control command and data). In the embodiment, the information of the data part of the in-vehicle device signal S2 includes a response request that requests the portable device 1 to respond and the in-vehicle device ID stored in the in-vehicle device 2. The RSSI is a signal part having a predetermined pattern for calculating an RSSI value of the in-vehicle device signal S2.

The portable device signal S1 includes a preamble and a data part. The preamble is a signal part having a predetermined pattern indicating that the signal is the portable device signal S1. The data part is a signal part having information (such as a control command and data). In the embodiment, the information of the data part of the portable device signal S1 includes an unlocking request that requests the in-vehicle device 2 to unlock the vehicle, the portable device ID stored in the portable device 1, a distance L from the portable device 1 to the in-vehicle device 2 calculated by the portable device 1 based on a RSSI value of the RSSI part of the in-vehicle device signal S2, a first travel distance L1, and a height H1. The first travel distance L1 and the height H1 will be described later.

Next, an operation of the RKE system 100 and an overview of a relay attack will be described. FIG. 3 is a drawing illustrating an overview of an operation of the RKE system 100. The RKE system 100 according to the embodiment is what is called a smart keyless entry system. The in-vehicle device 2 installed in the vehicle periodically transmits the in-vehicle device signal S2 including the response request. When the proper user U approaches the vehicle, the portable device 1 carried by the user U receives the in-vehicle device signal S2 and transmits the portable device signal S1 including an unlocking request in response to the in-vehicle device signal S2. When the in-vehicle device 2 receives the portable device signal S1, the in-vehicle device 2 unlocks the vehicle. This enables the user U to unlock the vehicle with only approaching the vehicle without operating the portable device 1.

Figure 4:
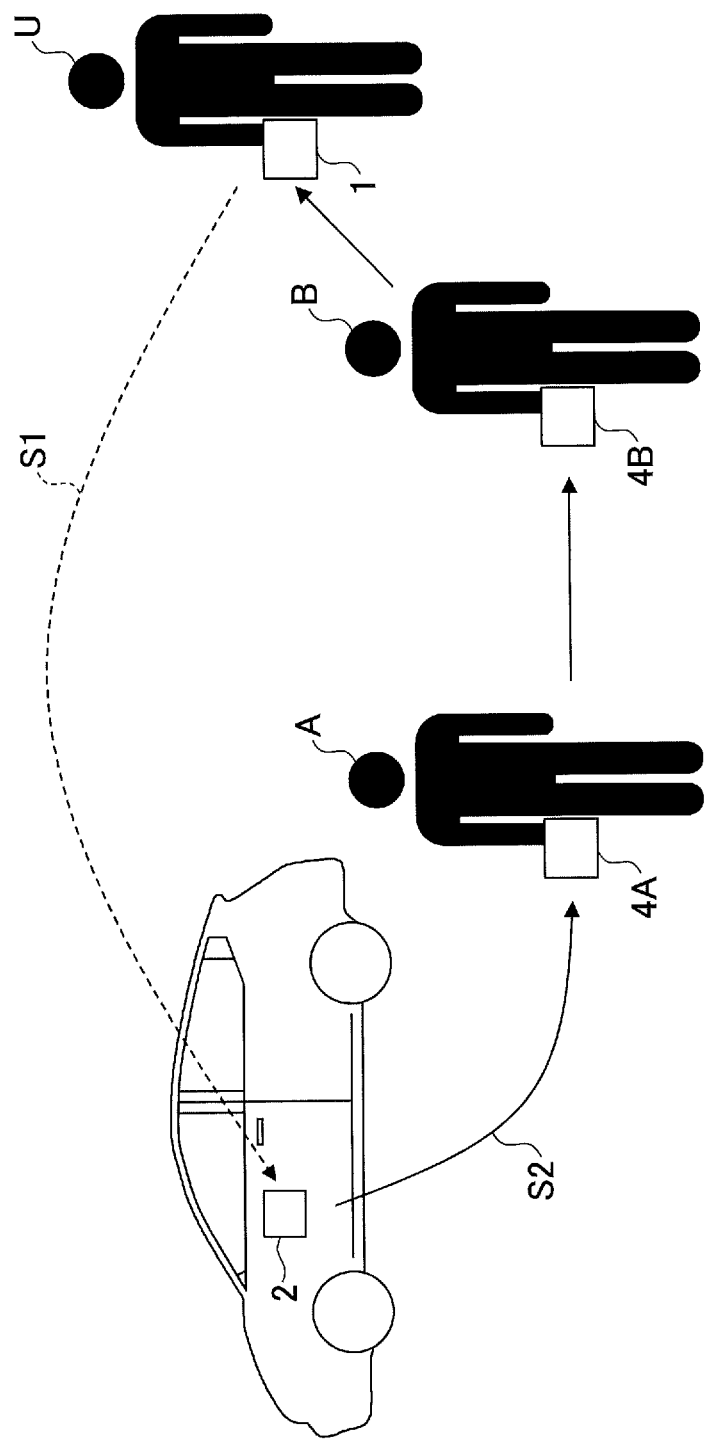
FIG. 4 is a drawing for describing an overview of a relay attack.

FIG. 4 is a drawing for describing an overview of a relay attack. The relay attack is performed by an improper person A who is near the vehicle and has a relaying device 4A and an improper person B who is near the user U and has a relaying device 4B. The improper person A receives the in-vehicle device signal S2 with the relaying device 4A, applies frequency conversion to the received in-vehicle device signal S2, and transmits the converted in-vehicle device signal S2. The improper person B receives the in-vehicle device signal S2 transmitted by the relaying device 4A, applies frequency conversion to the received in-vehicle device signal S2 to be converted to an original frequency, and transmits the converted in-vehicle device signal S2. When the portable device carried by the user U receives the in-vehicle device signal S2 transmitted by the relaying device 4B, the portable device transmits the portable device signal S1 including an unlocking request in response to the in-vehicle device signal S2. When the in-vehicle device 2 receives the portable device signal S1, the in-vehicle device 2 unlocks the vehicle. As described, when the relay attack is performed, the vehicle is unlocked even though the user U is away from the vehicle.

In order to prevent such a relay attack, the RKE system 100 according to the embodiment determines whether the relay attack is performed using a travel distance of the portable device 1.

Figure 5:
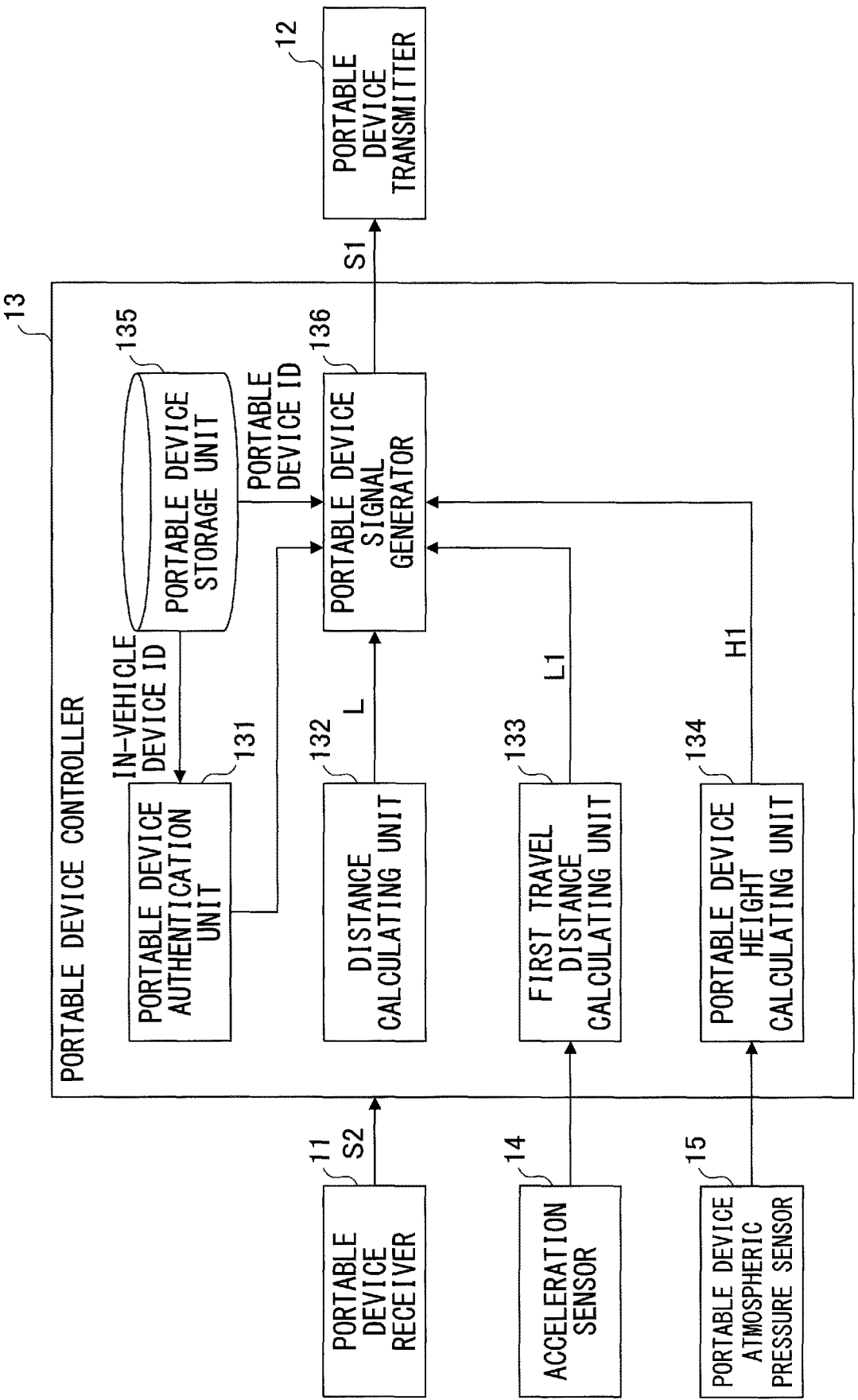
FIG. 5 is a drawing illustrating an example of a functional configuration of a portable device controller.

Next, a functional configuration of the portable device controller 13 will be described. FIG. 5 is a drawing illustrating an example of a functional configuration of the portable device controller 13. The portable device controller 13 illustrated in FIG. 5 includes a portable device authentication unit 131, a distance calculating unit 132, a first travel distance calculating unit 133, a portable device height calculating unit 134, a portable device storage unit 135, and a portable device signal generator 136. The portable device authentication unit 131, the distance calculating unit 132, the first travel distance calculating unit 133, the portable device height calculating unit 134, and the portable device signal generator 136 are achieved by the CPU of the portable device controller 13 executing a program. The portable device storage unit 135 is achieved by the ROM and the RAM of the portable device controller 13.

The portable device authentication unit 131 authenticates the in-vehicle device signal S2 received by the portable device receiver 11. Specifically, when a signal is input from the portable device receiver 11, the portable device authentication unit 131 checks whether the input signal includes a preamble indicating that the signal is the in-vehicle device signal S2. When the preamble is not included, the portable device authentication unit 131 determines that the input signal is not the in-vehicle device signal S2 and terminates the process. When the preamble is included, the portable device authentication unit 131 determines that the input signal is the in-vehicle device signal S2 and obtains the in-vehicle device ID included in the data part of the in-vehicle device signal S2. The portable device authentication unit 131 reads the in-vehicle device ID of the in-vehicle device 2, which is corresponding to the portable device itself, from the portable device storage unit 135.

The portable device authentication unit 131 compares the in-vehicle device ID obtained from the in-vehicle device signal S2 with the in-vehicle device ID of the in-vehicle device 2 corresponding to the portable device itself. When these in-vehicle device IDs do not match, the portable device authentication unit 131 determines that the input signal is not the in-vehicle device signal S2 from the corresponding in-vehicle device 2 (i.e., the input signal is the in-vehicle device signal S2 from another in-vehicle device 2) and terminates the process. When the in-vehicle device IDs match, the portable device authentication unit 131 determines that the input signal is the in-vehicle device signal S2 from the corresponding in-vehicle device 2 and requests the portable device signal generator 136 to generate the portable device signal S1.

The distance calculating unit 132 calculates a RSSI value of the in-vehicle device signal S2 based on the RSSI part of the in-vehicle device signal S2 and calculates the distance L from the portable device 1 to the in-vehicle device 2 based on the RSSI value. A method of calculating the distance L is selectable. For example, in advance the portable device storage unit 135 stores a table in which the RSSI value and the distance L are associated, and the distance calculating unit 132 that has calculated the RSSI value can obtain the distance L by referring to the table. The method of calculating the distance L is not limited to this.

The first travel distance calculating unit 133 obtains acceleration from the acceleration sensor 14 and calculates the first travel distance L1 of the portable device 1 with integrating the obtained acceleration. That is, the first travel distance L1 is a travel distance of the portable device 1 calculated based on the acceleration of the portable device 1 measured by the acceleration sensor 14.

The portable device height calculating unit 134 obtains atmospheric pressure from the portable device atmospheric pressure sensor 15 and calculates the height H1 of the portable device 1 based on the obtained atmospheric pressure. A method of calculating the height H1 is selectable.

The portable device storage unit 135 previously stores the portable device ID of the portable device itself and the in-vehicle device ID of the in-vehicle device 2 corresponding to the portable device itself.

The portable device signal generator 136 generates the portable device signal S1 in response to a request from the portable device authentication unit 131 and causes the portable device transmitter 12 to transmit the portable device signal S1 wirelessly. Specifically, when the portable device signal generator 136 is requested to generate the portable device signal S1 by the portable device authentication unit 131, the portable device signal generator 136 obtains the distance L from the distance calculating unit 132, the first travel distance L1 from the first travel distance calculating unit 133, the height H1 from the portable device height calculating unit 134, and the portable device ID from the portable device storage unit 135. The portable device signal generator 136 generates the portable device signal S1 including the distance L, the first travel distance L1, the height H1, and the portable device ID, which are obtained, and also an unlocking request, and inputs the portable device signal S1 to the portable device transmitter 12.

Figure 6:
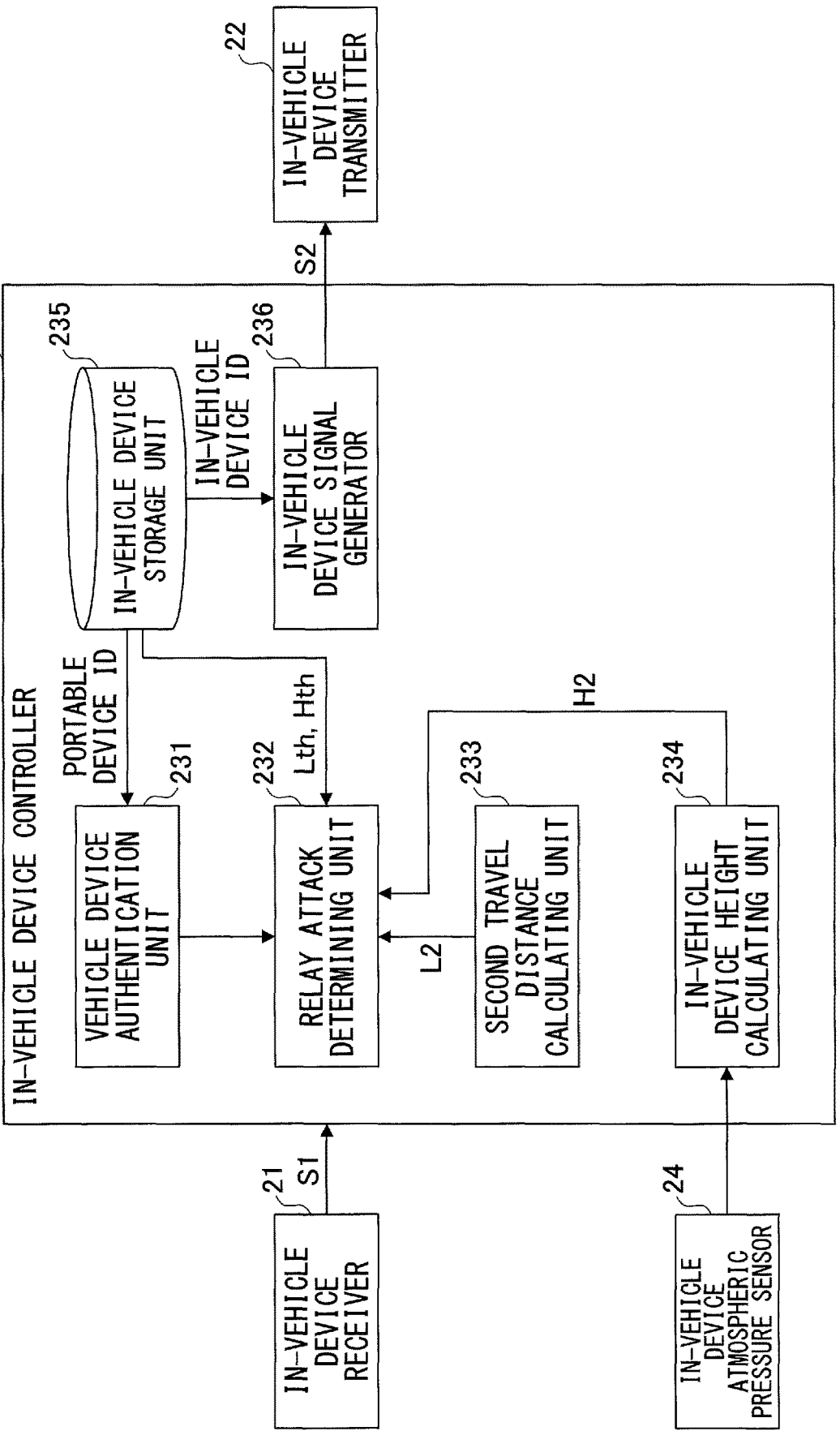
FIG. 6 is a drawing illustrating an example of a functional configuration of an in-vehicle device controller.

Next, a functional configuration of the in-vehicle device controller 23 will be described. FIG. 6 is a drawing illustrating an example of a functional configuration of the in-vehicle device controller 23. The in-vehicle device controller 23 illustrated in FIG. 6 includes an in-vehicle device authentication unit 231, a relay attack determining unit 232, a second travel distance calculating unit 233, an in-vehicle device height calculating unit 234, an in-vehicle device storage unit 235, and an in-vehicle device signal generator 236. The in-vehicle device authentication unit 231, the relay attack determining unit 232, the second travel distance calculating unit 233, the in-vehicle device height calculating unit 234, and the in-vehicle device signal generator 236 are achieved by the CPU of the in-vehicle device controller 23 executing a program. The in-vehicle device storage unit 235 is achieved by the ROM and the RAM of the in-vehicle device controller 23.

The in-vehicle device authentication unit 231 authenticates the portable device signal S1 received by the in-vehicle device receiver 21. Specifically, when the signal is input from the in-vehicle device receiver 21, the in-vehicle device authentication unit 231 checks whether the input signal includes a preamble indicating that the signal is the portable device signal S1. When the preamble is not included, the in-vehicle device authentication unit 231 determines that the input signal is not the portable device signal S1 and terminates the process. When the preamble is included, the in-vehicle device authentication unit 231 determines that the input signal is the portable device signal S1 and obtains the portable device ID included in the data part of the portable device signal S1. The in-vehicle device authentication unit 231 reads the portable device ID of the portable device 1, which is corresponding to the in-vehicle device itself, from the in-vehicle device storage unit 235.

The in-vehicle device authentication unit 231 compares the portable device ID obtained from the portable device signal S1 with the portable device ID of the portable device 1 corresponding to the in-vehicle device itself. When these portable device IDs do not match, the in-vehicle device authentication unit 231 determines that the input signal is not the portable device signal S1 from the corresponding portable device 1 (i.e., the input signal is the portable device signal S1 from another portable device 1) and terminates the process. When the portable device IDs match, the in-vehicle device authentication unit 231 determines that the input signal is the portable device signal S1 from the corresponding portable device 1 and requests the relay attack determining unit 232 to determine whether a relay attack is performed.

The relay attack determining unit 232 determines whether a relay attack is performed based on the first travel distance L1, a second travel distance L2, the height H1 of the portable device 1, and a height H2 of the in-vehicle device 2. The relay attack determining unit 232 stores the distance L included in a previously received portable device signal S1 until receiving a next portable device signal S1. The second travel distance L2 and a determining method will be described later.

The second travel distance calculating unit 233 calculates the second travel distance L2 of the portable device 1 based on the distance L included in the portable device signal S1. That is, the second travel distance L2 is a travel distance of the portable device 1 calculated based on the distance L between the portable device 1 and the in-vehicle device 2. Specifically, the second travel distance calculating unit 233 calculates a difference between the distance L included in a previously received portable device signal S1 and the distance L included in a newly received portable device signal S1 as the second travel distance L2.

The in-vehicle device height calculating unit 234 obtains atmospheric pressure from the in-vehicle device atmospheric pressure sensor 24 and calculates the height H2 of the in-vehicle device 2 based on the obtained atmospheric pressure. A method of calculating the height H2 is selectable.

The in-vehicle device storage unit 235 previously stores the in-vehicle device ID of the in-vehicle device itself, the portable device ID of the portable device 1 corresponding to the in-vehicle device itself, a first threshold Lth, and a second threshold Hth. The first threshold Lth and the second threshold Hth are predetermined thresholds for determining whether a relay attack is performed.

The in-vehicle device signal generator 236 periodically generates the in-vehicle device signal S2 and causes the in-vehicle device transmitter 22 to transmit the in-vehicle device signal S2 wirelessly. Specifically, the in-vehicle device signal generator 236 periodically obtains the in-vehicle device ID from the in-vehicle device storage unit 235, generates the in-vehicle device signal S2 including the obtained in-vehicle device ID and a response request, and inputs the in-vehicle device signal S2 to the in-vehicle device transmitter 22.

Figure 7:
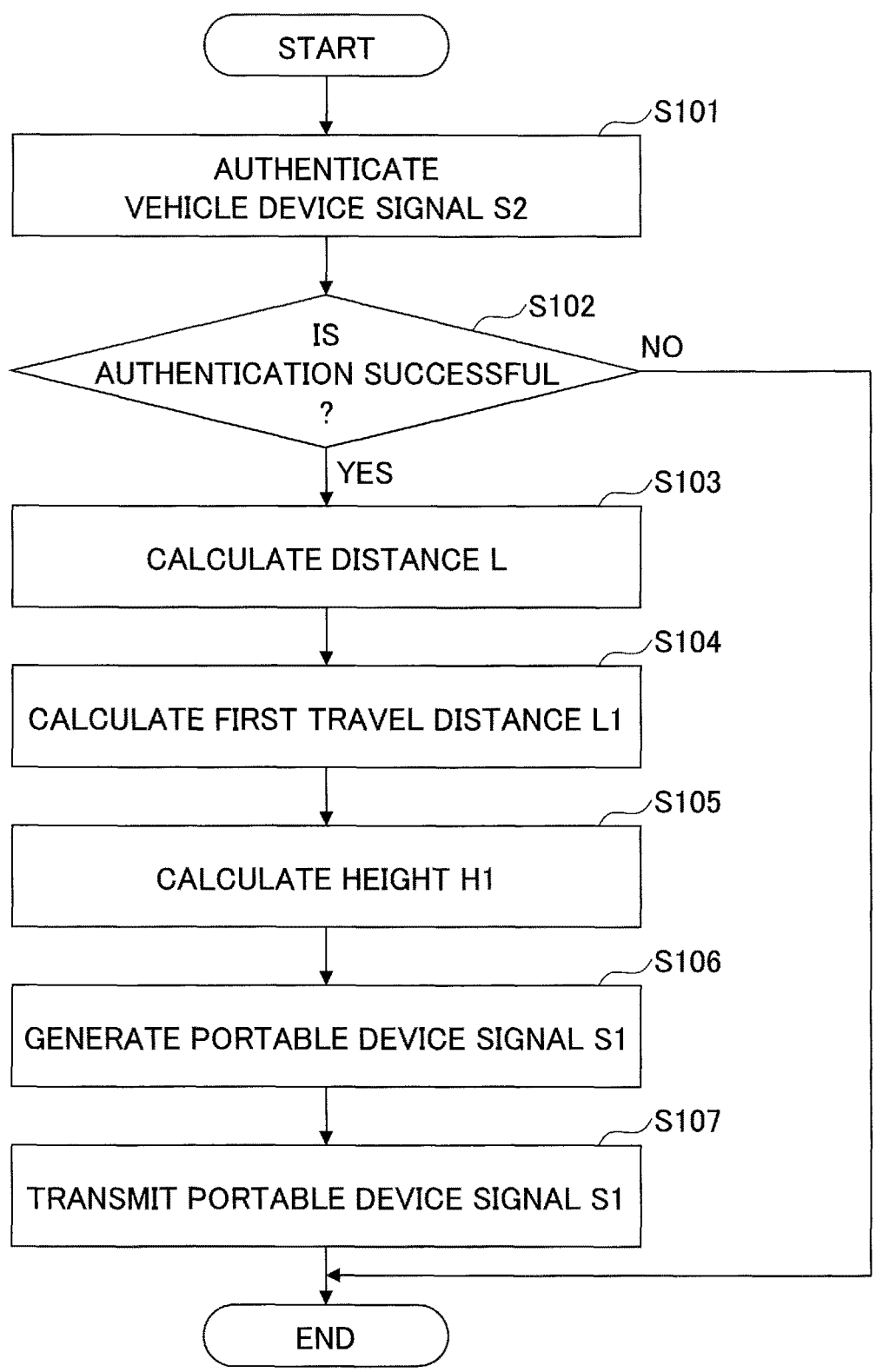
FIG. 7 is a flowchart illustrating an example of an operation of a portable device.

Next, an operation of the portable device 1 will be described. FIG. 7 is a flowchart illustrating an example of the operation of the portable device 1. As described above, the in-vehicle device 2 periodically transmits the in-vehicle device signal S2. When the portable device 1 receives the in-vehicle device signal S2, the portable device 1 performs the operation illustrated in FIG. 7.

When the portable device receiver 11 receives the in-vehicle device signal S2, in step S101, the portable device authentication unit 131 first authenticates the in-vehicle device signal S2. When the portable device authentication unit 131 fails to authenticate the in-vehicle device signal S2 (NO in step S102), that is, when the received in-vehicle device signal S2 is not the in-vehicle device signal S2 transmitted from the in-vehicle device 2 corresponding to the portable device 1, the portable device 1 terminates the operation.

With respect to the above, when the portable device authentication unit 131 succeeds in authenticating the in-vehicle device signal S2 (YES in step S102), that is, when the received in-vehicle device signal S2 is the in-vehicle device signal S2 transmitted from the in-vehicle device 2 corresponding to the portable device 1, the portable device authentication unit 131 requests the portable device signal generator 136 to generate the portable device signal S1.

In step S103, when the portable device signal generator 136 is requested to generate the portable device signal S1, the distance calculating unit 132 calculates the distance L based on the in-vehicle device signal S2.

In Step S104, the first travel distance calculating unit 133 calculates a travel distance in which the portable device 1 has traveled from when the portable device signal S1 was previously transmitted to the present, based on the acceleration measured by the acceleration sensor 14 as the first travel distance L1.

In Step S105, the portable device height calculating unit 134 calculates the height H1 of the portable device 1 based on the atmospheric pressure measured by the portable device atmospheric pressure sensor 15. The order of steps S103 to S105 is selectable.

Subsequently, in step S106, the portable device signal generator 136 generates the portable device signal S1 including the distance L, the first travel distance L1, and the height H1, and also the portable device ID of the portable device itself and an unlocking request. In step S107, the portable device transmitter 12 transmits the generated portable device signal S1 wirelessly. The portable device 1 performs the above-described operation every time the portable device 1 receives the in-vehicle device signal S2.

Figure 8:
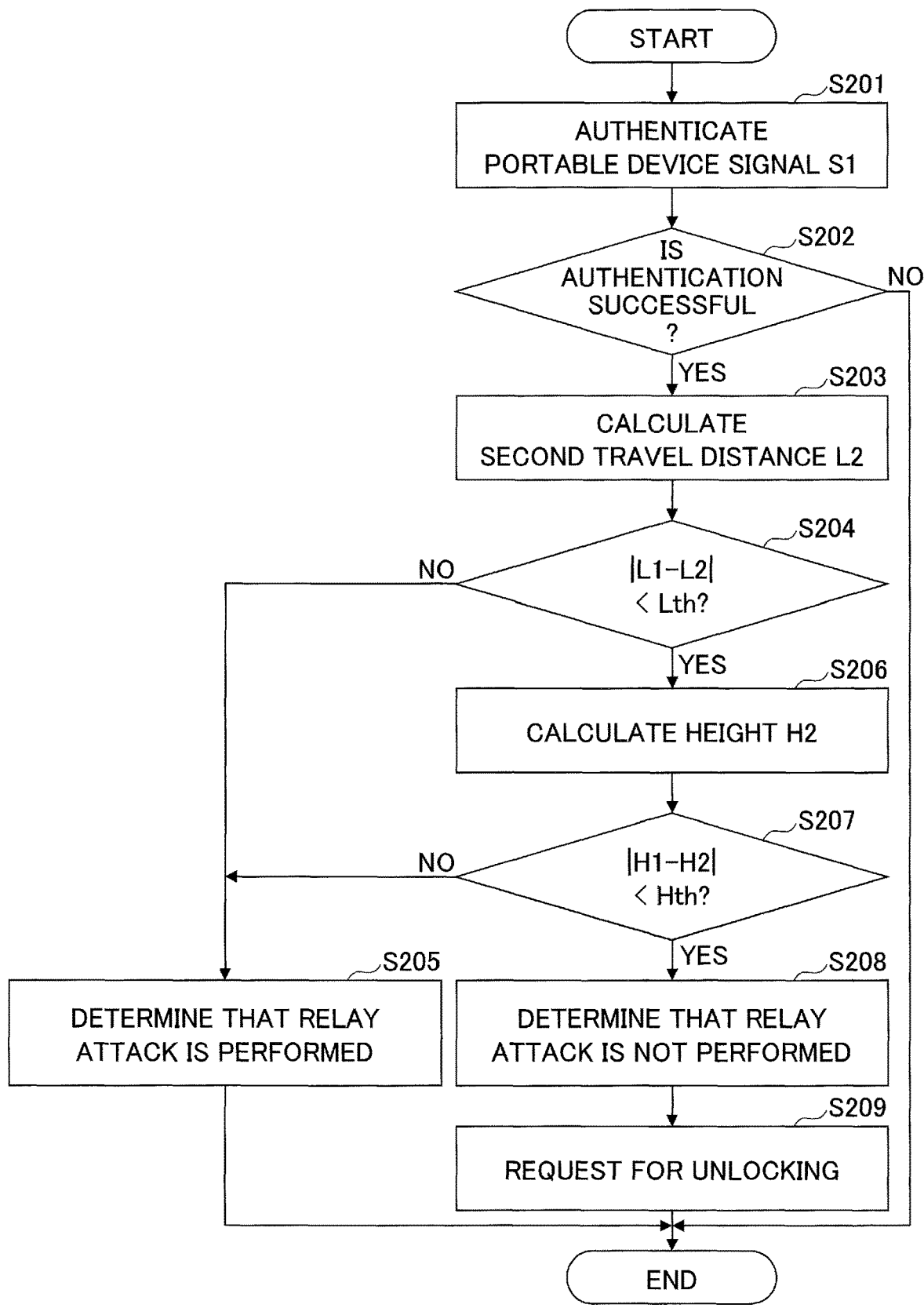
FIG. 8 is a flowchart illustrating an example of an operation of an in-vehicle device.

Next, an operation of the in-vehicle device 2 will be described. FIG. 8 is a flowchart illustrating an example of the operation of the in-vehicle device 2. When the in-vehicle device 2 receives the portable device signal S1, the in-vehicle device 2 performs the operation illustrated in FIG. 8.

In Step S201, when the in-vehicle device receiver 21 first receives the portable device signal S1, the in-vehicle device authentication unit 231 authenticates the portable device signal S1. At this time, the in-vehicle device authentication unit 231 may specify a condition that the distance L included in the portable device signal S1 is smaller than a predetermined distance as an authentication condition. The predetermined distance is, for example, 2 m, but is not limited to this. When the in-vehicle device authentication unit 231 fails to authenticate the portable device signal S1 (NO in step S202), that is, when the received portable device signal S1 is not the portable device signal S1 transmitted from the portable device 1 corresponding to the in-vehicle device 2, the in-vehicle device 2 terminates the operation.

When the in-vehicle device authentication unit 231 succeeds in authenticating the portable device signal S1 (YES in step S202), that is, when the received portable device signal S1 is the portable device signal S1 transmitted from the portable device 1 corresponding to the in-vehicle device 2, the in-vehicle device authentication unit 231 requests the relay attack determining unit 232 to determine whether a relay attack is performed.

In step S203, when the relay attack determining unit 232 is requested to perform a determination, the second travel distance calculating unit 233 calculates a difference between the distance L included in the portable device signal S1 and the distance L included in the previously received portable device signal S1 as the second travel distance L2.

Next, in step S204, the relay attack determining unit 232 compares a difference between the calculated second travel distance L2 and the first travel distance L1 included in the portable device signal S1 ($|L1-L2|$) with the first threshold Lth. When a relay attack is not performed, the first travel distance L1 and the second travel distance L2 are approximately equal, and the difference is small. When a relay attack is performed, the first travel distance L1 is a value in accordance with a travel distance of the user U, while the second travel distance L2 is a value in accordance with change of a distance between the user U and the improper person B. Therefore, the difference between the first travel distance L1 and the second travel distance L2 can be large.

Thus, in Step S205, the relay attack determining unit 232 determines that a relay attack is performed when the difference between the first travel distance L1 and the second travel distance L2 is greater than or equal to the first threshold Lth (NO in Step S204). The first threshold Lth is, for example, 50 cm, but is not limited to this. When the relay attack determining unit 232 determines that a relay attack is performed, the in-vehicle device 2 terminates the operation. That is, when the difference between the first travel distance L1 and the second travel distance L2 is greater than or equal to the first threshold Lth, the vehicle is not unlocked.

When the difference between the first travel distance L1 and the second travel distance L2 is smaller than the first threshold Lth (YES in step S204), the in-vehicle device height calculating unit 234 calculates the height H2 of the in-vehicle device 2 based on the atmospheric pressure measured by the in-vehicle device atmospheric pressure sensor 24 in step S206.

Next, in step S207, the relay attack determining unit 232 compares a difference between the calculated height H2 of the in-vehicle device 2 and the height H1 of the portable device 1 included in the portable device signal S1 ($|H1-H2|$) with the second threshold Hth. When a relay attack is not performed, the height H1 is a height of the portable device 1 carried by the user U near the vehicle. Thus, the difference between the height H1 and the height H2 is considered to fall within a predetermined range. When a relay attack is performed, the height H1 is a height of the portable device 1 carried by the user U who is away from the vehicle (e.g., on a different floor from the vehicle). Thus, the difference between the height H1 and the height H2 can be large.

Therefore, when the difference between the height H1 and the height H2 is greater than or equal to the second threshold Hth (NO in step S207), the relay attack determining unit 232 determines that the relay attack is performed in step S205. The second threshold Hth is, for example, 80 cm, but is not limited to this. When the relay attack determining unit 232 determines that the relay attack is performed, the in-vehicle device 2 terminates the operation. That is, when the difference between the height H1 and the height H2 is greater than or equal to the second threshold Hth, the vehicle is not unlocked.

When the difference between the height H1 and the height H2 is smaller than the second threshold Hth (YES in step S207), the relay attack determining unit 232 determines that a relay attack is not performed in step S208, and requests the door controller 3 to unlock the vehicle in step S209. The door controller 3, which is requested to unlock, unlocks the door.

As described above, the RKE system 100 according to the present embodiment determines whether a relay attack is performed based on the first travel distance L1 and the second travel distance L2 of the portable device 1, the height H1 of the portable device 1, and the height H2 of the in-vehicle device 2.

The improper person can fake the distance L calculated by the portable device 1 with adjusting strength of the in-vehicle device signal S2 transmitted from the relaying device 4B, thereby faking the second travel distance L2 as a result. However, as the improper person cannot know or fake the first travel distance L1 calculated inside the portable device 1, it is extremely difficult to fake the second travel distance L2 so that the difference between the first travel distance L1 and the second travel distance L2 is smaller than the first threshold Lth. In other words, when a relay attack is performed, there is a high possibility that the difference between the first travel distance L1 and the second travel distance L2 is greater than or equal to the first threshold Lth. Thus, according to the embodiment, a relay attack can be accurately detected based on the first travel distance L1 and the second travel distance L2 of the portable device 1.

Additionally, when a relay attack is performed with respect to the user U who is at a different height from the vehicle (e.g., on a different floor or on a staircase), there is a high possibility that the difference between the height H1 and the height H2 is greater than or equal to the second threshold Hth because the improper person cannot fake the height H1 calculated inside the portable device 1. Thus, according to the present embodiment, a relay attack to the user U who is at a different height from the vehicle can be accurately detected based on the height H1 of the portable device 1 and the height H2 of the in-vehicle device 2.

As described above, the RKE system 100 according to the present embodiment accurately detects a relay attack and controls not to unlock the vehicle when a relay attack is detected. As a result, the present embodiment can prevent the vehicle from being improperly unlocked by a relay attack, and can improve anti-theft performance of the vehicle.

In the example illustrated in FIG. 8, the relay attack determining unit 232 performs a determination of a relay attack based on the first travel distance L1 and the second travel distance L2 and performs a determination of a relay attack based on the height H1 and the height H2, but may only perform either.

For example, when the relay attack determining unit 232 determines whether a relay attack is performed only based on the first travel distance L1 and the second travel distance L2, the portable device atmospheric pressure sensor 15 and the in-vehicle device atmospheric pressure sensor 24 are not required. Step S206 and step S207 can be omitted and when the difference between the first travel distance L1 and the second travel distance L2 is smaller than the first threshold Lth (YES in Step S204), the in-vehicle device 2 may determine that a relay attack is not performed in step S208.

When the relay attack determining unit 232 determines whether a relay attack is performed only based on the height H1 and the height H2, the acceleration sensor 14 is not required. Step S203 and step S204 can be omitted and when authentication of the portable device signal S1 is successful (YES in Step S202), the in-vehicle device 2 may calculate the height H2 in step S206.

The relay attack determining unit 232 may determine whether a relay attack is performed based on the first travel distance L1 and the second travel distance L2 after the relay attack determining unit 232 determine whether a relay attack is performed based on the height H1 and the height H2.

Additionally, the portable device controller 13 may determine whether a relay attack is performed based on the first travel distance L1, the second travel distance L2, the height H1 of the portable device 1, and the height H2 of the in-vehicle device 2, instead of the in-vehicle device controller 23 or with the in-vehicle device controller 23. That is, the portable device controller 13 may include a relay attack determining unit. The portable device controller 13 can determine whether a relay attack is performed with a method similar to the method performed by the in-vehicle device controller 23. In this case, the in-vehicle device 2 may transmit the in-vehicle device signal S2 including at least one of the second travel distance L2 and the height H2, and the portable device 1 may determine whether a relay attack is performed using at least one of the second travel distance L2 and the height H2 included in the in-vehicle device signal S2.

In the example illustrated in FIG. 8, it is assumed that the portable device 1 can always calculate the first travel distance L1 from when the previous portable device signal S1 has been transmitted to when the subsequent portable device signal S1 is transmitted. Such processing can be performed by the portable device 1 storing all values of the acceleration input from the acceleration sensor 14 after transmitting a portable device signal S1 until transmitting a subsequent portable device signal S1, or by the portable device 1 updating the first travel distance L1 each time the acceleration is input from the acceleration sensor 14 after transmitting a portable device signal S1. However, such processing may lead to increasing storage capacity and computation quantity required for the portable device 1.

Thus, the portable device 1 may delete the acceleration in recording or reset the first travel distance L1 in updating, when a predetermined time T1 elapses after the portable device signal S1 is previously transmitted. According to this process, when a subsequent portable device signal S1 is transmitted after a predetermined time period T1 or longer elapses after the portable device signal S1 is previously transmitted, the portable device 1 cannot calculate the first travel distance L1. However, when the predetermined time T1 is set to be longer than a transmission interval of the in-vehicle device signal S2, and the portable device 1 continuously receives the in-vehicle device signal S2 and continuously transmits the portable device signal S1, the portable device 1 can calculate the first travel distance L1 when the portable device 1 transmits the portable device signal S1 for the second time or later.

In this case, when the in-vehicle device 2 receives the portable device signal S1 that does not include the first travel distance L1 (i.e., the portable device signal S1 that is first received), the in-vehicle device 2 may not perform unlocking control corresponding to the portable device signal S1 (step S203 to step S209 in FIG. 8). When the in-vehicle device 2 receives the portable device signal S1 that includes the first travel distance L1 (i.e., the portable device signal S1 that is received for the second time or later), the in-vehicle device 2 may perform unlocking control corresponding to the portable device signal S1 (step S203 to step S209 in FIG. 8). This can accurately detect a relay attack while reducing storage capacity and computation quantity required for the portable device 1.

According to at least one embodiment of the present invention, the RKE system that can accurately detect a relay attack can be provided.

It should be noted that the present invention is not limited to the above-described configuration, such as the configuration described in the above-described embodiment and a combination of the configuration in the embodiment and another element. These points can be modified without departing from the spirit of the present invention, and can be appropriately determined according to the application form.

What is claimed is:
1. A remote keyless entry system comprising:
an in-vehicle device including an in-vehicle device controller, an in-vehicle device transmitter configured to transmit an in-vehicle device signal, and an in-vehicle device receiver configured to receive a portable device signal; and a portable device including a portable device controller, an acceleration sensor, a portable device receiver configured to receive the in-vehicle device signal, and a portable device transmitter configured to transmit the portable device signal, wherein the portable device controller starts a first travel distance measurement process upon transmitting the portable device signal, the first travel distance measurement process using acceleration measured by the acceleration sensor;

wherein the portable device controller stops the first travel distance measurement process when a predetermined time period elapses after the portable device transmitter has transmitted the portable device signal, the predetermined time period being set to be longer than a transmission interval of the in-vehicle device signal;

wherein the portable device controller calculates a distance from the in-vehicle device to the portable device based on the in-vehicle device signal, wherein, in response to receiving the in-vehicle device signal, in a case where the first travel distance measurement process is being performed, the portable device controller finishes the first travel distance measurement process, calculates a first travel distance of the portable device based on a result of the first travel distance measurement process, and causes the portable device transmitter to transmit the portable device signal including the first travel distance and the distance from the in-vehicle device to the portable device calculated based on the in-vehicle device signal, wherein the in-vehicle device controller receives the portable device signal a plurality of times and calculates a second travel distance of the portable device based on distances from the in-vehicle device to the portable device calculated based on the in-vehicle device signal included in received portable device signals, and wherein the in-vehicle device controller determines whether a relay attack is performed based on the first travel distance and the second travel distance.

2. The remote keyless entry system as claimed in claim 1, wherein the in-vehicle device controller determines that the relay attack is performed when a difference between the first travel distance and the second travel distance is greater than or equal to a first threshold.

3. The remote keyless entry system as claimed in claim 1, wherein the in-vehicle device further includes an in-vehicle device atmospheric pressure sensor, wherein the portable device further includes a portable device atmospheric pressure sensor, wherein the portable device controller calculates a height of the portable device based on atmospheric pressure measured by the portable device atmospheric pressure sensor, and causes the portable device transmitter to transmit the portable device signal including the calculated height of the portable device, wherein the in-vehicle device controller receives the portable device signal including the calculated height of the portable device;

wherein the in-vehicle device controller calculates a height of the in-vehicle device based on atmospheric pressure measured by the in-vehicle device atmospheric pressure sensor, and wherein the in-vehicle device controller determines whether the relay attack is performed based on the height of the portable device and the height of the in-vehicle device.

4. The remote keyless entry system as claimed in claim 3, wherein the in-vehicle device controller determines that the relay attack is performed when a difference between the height of the portable device and the height of the in-vehicle device is greater than or equal to a second threshold.

5. A remote keyless entry system comprising:
an in-vehicle device including an in-vehicle device controller, an in-vehicle device transmitter configured to transmit an in-vehicle device signal, and an in-vehicle device receiver configured to receive a portable device signal; and a portable device including a portable device controller, an acceleration sensor, a portable device receiver configured to receive the in-vehicle device signal, and a portable device transmitter configured to transmit the portable device signal, wherein the portable device controller starts a first travel distance measurement process upon transmitting the portable device signal, the first travel distance measurement process using acceleration measured by the acceleration sensor;

wherein the portable device controller stops the first travel distance measurement process when a predetermined time period elapses after the portable device transmitter has transmitted the portable device signal, the predetermined time period being set to be longer than a transmission interval of the in-vehicle device signal;

wherein the portable device controller calculates a distance from the in-vehicle device to the portable device based on the in-vehicle device signal, wherein, in response to receiving the in-vehicle device signal, in a case where the first travel distance measurement process is being performed, the portable device controller finishes the first travel distance measurement process, calculates a first travel distance of the portable device based on a result of the first travel distance measurement process, and causes the portable device transmitter to transmit the portable device signal including the distance from the in-vehicle device to the portable device calculated based on the in-vehicle device signal, wherein the in-vehicle device controller receives the portable device signal a plurality of times, calculates a second travel distance of the portable device based on distances from the in-vehicle device to the portable device calculated based on the in-vehicle device signal included in received portable device signals, and causes the in-vehicle device transmitter to transmit the in-vehicle device signal including the calculated second travel, and wherein the portable device controller receives the in-vehicle device signal including the second travel distance calculated by the in-vehicle device controller and determines whether a relay attack is performed based on the first travel distance and the received second travel distance.

6. The remote keyless entry system as claimed in claim 5, wherein the portable device controller determines that the relay attack is performed when a difference between the first travel distance and the second travel distance is greater than or equal to a first threshold.

7. The remote keyless entry system as claimed in claim 5,
wherein the in-vehicle device further includes an in-vehicle device atmospheric pressure sensor,
wherein the portable device further includes a portable device atmospheric pressure sensor,
wherein the portable device controller calculates a height of the portable device based on atmospheric pressure measured by the portable device atmospheric pressure sensor,
wherein the in-vehicle device controller calculates a height of the in-vehicle device based on atmospheric pressure measured by the in-vehicle device atmospheric pressure sensor, and causes the in-vehicle device transmitter to transmit the in-vehicle device signal including the calculated height of the in-vehicle device,
wherein the portable device controller receives the in-vehicle device signal including the calculated height of the in-vehicle device; and
wherein the portable device controller determines whether the relay attack is performed based on the height of the portable device and the height of the in-vehicle device.

8. The remote keyless entry system as claimed in claim 7, wherein the portable device controller determines that the relay attack is performed when a difference between the height of the portable device and the height of the in-vehicle device is greater than or equal to a second threshold.

\* \* \* \* \*